(12) United States Patent
Lorenc et al.

(10) Patent No.: US 8,955,899 B2
(45) Date of Patent: Feb. 17, 2015

(54) INTEGRATED FLOATING OVERMOLDED SNAP-RING AND SEAL FOR A PLASTIC FUEL HOUSING ASSEMBLY

(75) Inventors: Simon J. Lorenc, Glenview, IL (US); Christopher D. Roberts, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/988,613

(22) PCT Filed: Oct. 25, 2011

(86) PCT No.: PCT/US2011/057656
§ 371 (c)(1),
(2), (4) Date: May 21, 2013

(87) PCT Pub. No.: WO2012/071124
PCT Pub. Date: May 31, 2012

(65) Prior Publication Data
US 2013/0249235 A1    Sep. 26, 2013

Related U.S. Application Data

(60) Provisional application No. 61/416,573, filed on Nov. 23, 2010.

(51) Int. Cl.
*B60K 15/04*    (2006.01)
*F16J 15/10*    (2006.01)
*B60K 15/05*    (2006.01)

(52) U.S. Cl.
CPC .............. *B60K 15/04* (2013.01); *B60K 15/05* (2013.01); *B60K 2015/0474* (2013.01); *B60K 2015/0553* (2013.01); *F16J 15/10* (2013.01)
USPC ...................................... 296/97.22; 277/637

(58) Field of Classification Search
CPC ........... B60K 15/04; B60K 2015/0553; B60K 15/03177; B60K 2015/0474; B60K 15/0406; B60K 15/05; B29C 45/4407; B29L 2031/56; B29L 2031/7172; Y10S 220/905; Y10S 220/33; Y10S 292/04; H04L 1/005; H04L 1/0052; H04L 1/06; H04L 1/0631; H04L 2025/03414; H04L 2025/0342; H04L 2025/03426; E05B 83/34; E05F 5/022; E05Y 2900/534; H04B 1/7107
USPC ......... 296/97.22, 146.11, 155; 220/375, 86.2, 220/203.1, 905, 95; 16/227, 225; 277/637, 277/630, 649
See application file for complete search history.

(56) References Cited

U.S. PATENT DOCUMENTS 4,653,660 A * 3/1987 Shaw ........................... 220/86.2
4,946,060 A * 8/1990 Sherwood et al. ........... 220/86.2

(Continued)

FOREIGN PATENT DOCUMENTS

DE    102008017687 A1    10/2009
WO    2010032160 A1    3/2010

OTHER PUBLICATIONS

International Search Report and Written Opinion corresponding to PCT/US2011/057656, dated Aug. 17, 2012.

*Primary Examiner* — Glenn Dayoan
*Assistant Examiner* — Sunsurraye Westbrook
(74) *Attorney, Agent, or Firm* — Paul F. Donovan

(57) ABSTRACT

A fuel housing assembly for a vehicle fuel system includes a rigid housing and, an inner seal assembly flexible body for sealing engagement with a fuel pipe and with a body panel of the vehicle. A rigid snap ring for attachment to the body panel is held by the flexible body.

20 Claims, 3 Drawing Sheets

(56) References Cited

U.S. PATENT DOCUMENTS

| | | | |
|---|---|---|---|
| 5,906,406 A * | 5/1999 | Pajakowski | 296/97.22 |
| 6,033,006 A * | 3/2000 | Bovellan et al. | 296/97.22 |
| 6,446,826 B1 * | 9/2002 | Foltz et al. | 220/86.2 |
| 7,311,348 B1 | 12/2007 | Bang | |
| 7,549,694 B2 * | 6/2009 | Scott et al. | 296/97.22 |
| 2007/0046062 A1 | 3/2007 | Yoshimura | |
| 2008/0210692 A1 * | 9/2008 | Fujita | 220/562 |
| 2011/0017732 A1 | 1/2011 | Herzig | |

* cited by examiner

INTEGRATED FLOATING OVERMOLDED SNAP-RING AND SEAL FOR A PLASTIC FUEL HOUSING ASSEMBLY

CROSS-REFERENCE TO RELATED APPLICATIONS

The present application is a National Phase of International Application Number PCT/US2011/057656, filed Oct. 25, 2011, and claims the benefits of U.S. Provisional Application for Patent, Ser. No. 61/416,573, filed Nov. 23, 2010.

FIELD OF THE INVENTION

The present invention relates generally to automotive fuel systems and to the installation of fuel system housings around the refueling inlet portion of automotive fuel systems. More particularly, the invention pertains to the inner seal between the housing and the inner sheet-metal panel of the automobile body.

BACKGROUND OF THE INVENTION

In known fuel systems for automobiles, a refueling inlet pipe extends from a fuel tank to an accessible location on the outside of the vehicle. It is known to provide a housing near the outer end of the refueling inlet pipe for holding the distal end of the pipe into which a refueling nozzle from a refueling pump can be inserted for refueling. A door or other housing closure may be provided to protect the distal end of the pipe. Known fuel system housing designs are made of hard plastic, such as glass filled polypropylene, and are configured to be installed into sheet-metal body panels of the vehicle at both the inner and outer ends of the housing. Generally, both the inner and outer edges of the fuel housing are sealed to the vehicle body sheet metal panels.

It is known to provide seals for the inner and outer edges of a fuel housing as integral portions of the fuel housing assembly by including a thermoplastic elastomer overmolded on the inner and outer ends of the housing. The fuel housing is first molded as a so-called "hard shot" of plastic, and the seals are then formed as so-called "soft shots" that are overmolded onto the housing to form an integral unit of the hard housing and the softer seals. As known to those skilled in the art, so-called "overmolding" is a two-shot molding process which first molds a first component of a first material. The molded component is loading to an injection mold tool cavity and a second shot, typically of a second material different from the first material, is molded around designated areas of the first component to form a bond between the two materials.

It is known to provide the hard shot or housing body with integrated snaps at the outer edge of the housing for attaching the housing to the outer sheet-metal panel. The housing body also provides rigidity to the fuel housing system that supports a hinge arm which holds the fuel door in position as it is opened and closed during the refueling of a vehicle.

Accordingly, a vehicle fuel system housing has two areas to be sealed during assembly. The overmolded soft shot perimeter seal or outer perimeter seal seals to an outer sheet metal panel, and the overmolded inner seal seals to a fuel pipe and to an inner sheet metal panel. While generally performing well, constructions of known designs have been somewhat difficult to install, particularly in positioning the inner seal properly. If proper seals are not established, it is possible that water will leak into the vehicle or that fuel vapors will enter the interior of the vehicle.

In a known design for a fuel housing assembly, the inner seal utilizes only a soft shot which, due to its soft and compliant characteristics, can be difficult to install into the vehicle inner sheet metal and difficult to manipulate into position to form a good seal to the inner sheet metal. It is known to form the soft overmolded inner seal with parallel circumferential ridges on the exterior surface. The seal is inserted through an opening in the sheet-metal, with the first encountered of the aforementioned parallel circumferential ridges being forced through the opening so that the sheet-metal edge resides in a valley between the parallel circumferential ridges. To achieve this positioning, it has been necessary in some installations to work from both sides of the sheet-metal body, both inside and outside the vehicle to manipulate the seal. This can be both difficult and time consuming.

SUMMARY OF THE INVENTION

As disclosed herein, an integrated, floating, snap-ring and seal for a plastic fuel housing assembly utilizes known overmolding processes to form an improved inner seal assembly. The inner seal assembly includes a compliant grommet, a rigid locking ring and a compliant inner pipe seal. The rigid locking ring acts as an attachment feature to the vehicle body.

Advantages of this invention in some forms thereof include an overmolded floating inner snap-ring that provides a positive snap attachment to an inner sheet metal panel, while the overmolded soft shot components provide a seal to the inner sheet metal and to the fuel pipe. In addition, the snap-ring can be installed easily into its proper position in an operator-friendly manner that minimizes ergonomic concerns.

In the exemplary embodiment to be described herein, the floating snap-ring seal includes two functional entities, an overmolded hard component snap-ring and an overmolded soft component sealing part. The hard component of an overmolded design utilizes an integrated snap feature that allows it to be attached into the inner sheet metal of a motor vehicle. The soft component of the overmolded inner snap-ring creates a flexible sealing surface when it is urged against the inner sheet metal. Benefits of this design include easy installation and the creation of a positive seal to the inner sheet metal upon engaging the snaps of the ring with the inner sheet metal panel.

Other features and advantages of the invention will become apparent to those skilled in the art upon review of the following detailed description, claims and drawings in which like numerals are used to designate like features.

Figure 1:
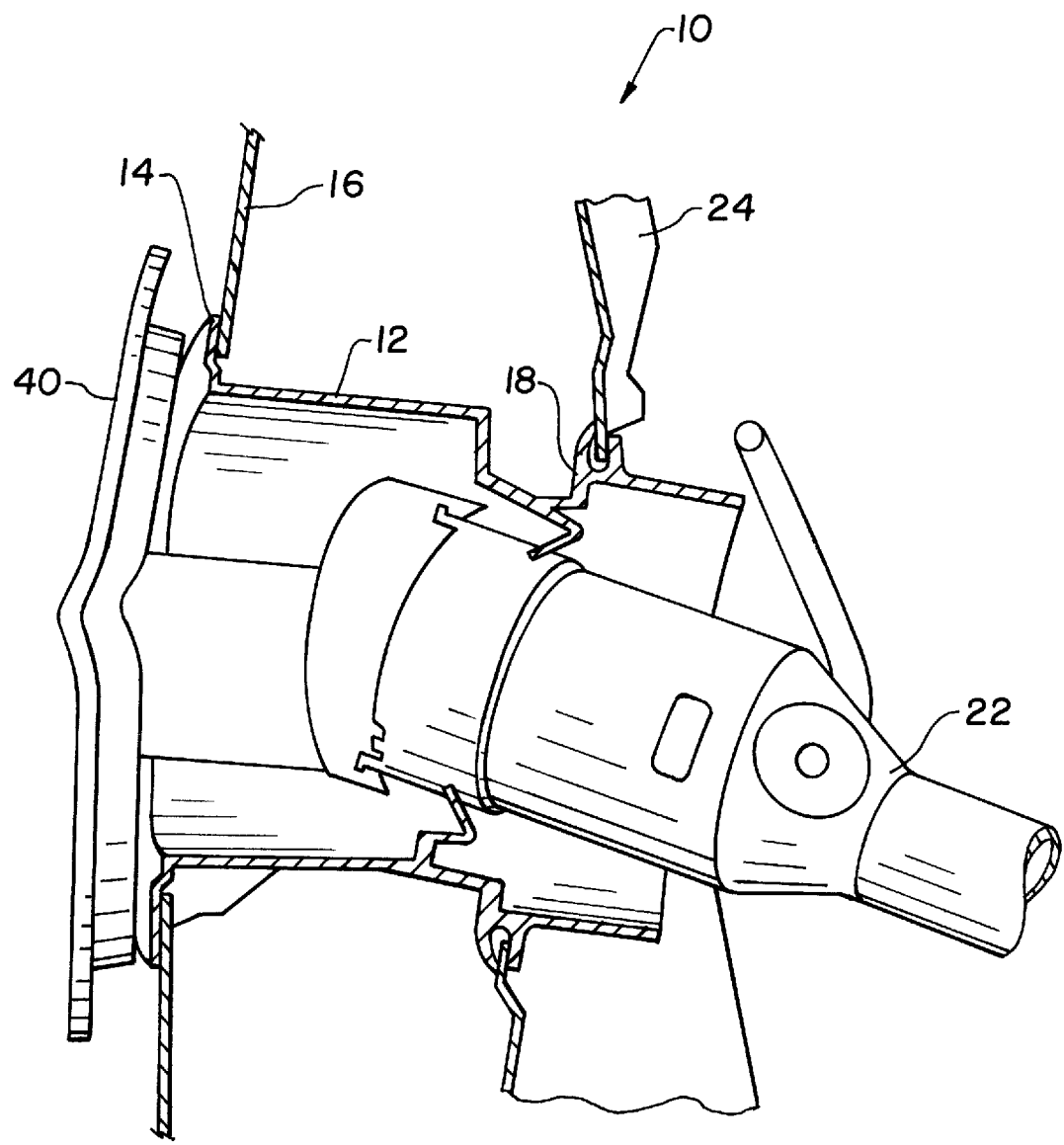
FIG. 1 is a cross-sectional view of a portion of a vehicle fuel system.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a fuel housing assembly 10 in a vehicle fuel system is shown. A hard plastic fuel housing 12 has two areas that require a seal. An overmolded soft shot perimeter seal 14 or outer perimeter seal 14 is provided to seal the fuel housing 12 to an outer sheet-metal panel 16. An overmolded inner seal 18 is provided to seal housing 12 to a fuel pipe 22 and to an inner sheet-metal panel 24. Generally, as disclosed herein, improvements are made to the inner seal 18. Fuel housing assembly 10 further includes a fuel door 40 which can be opened and closed selectively to expose and cover fuel pipe 22.

Figure 2:
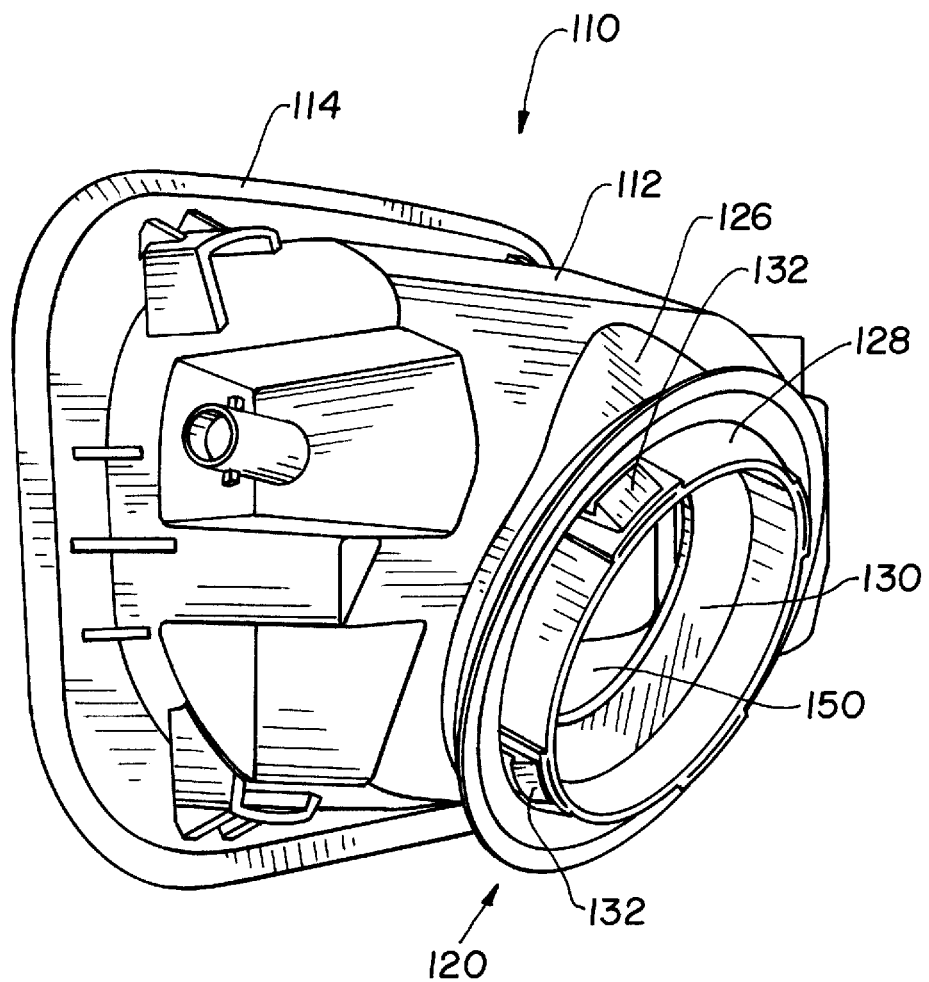
FIG. 2 is a perspective view of a fuel housing assembly with an overmolded snap-ring inner seal as disclosed herein.
Figure 3:
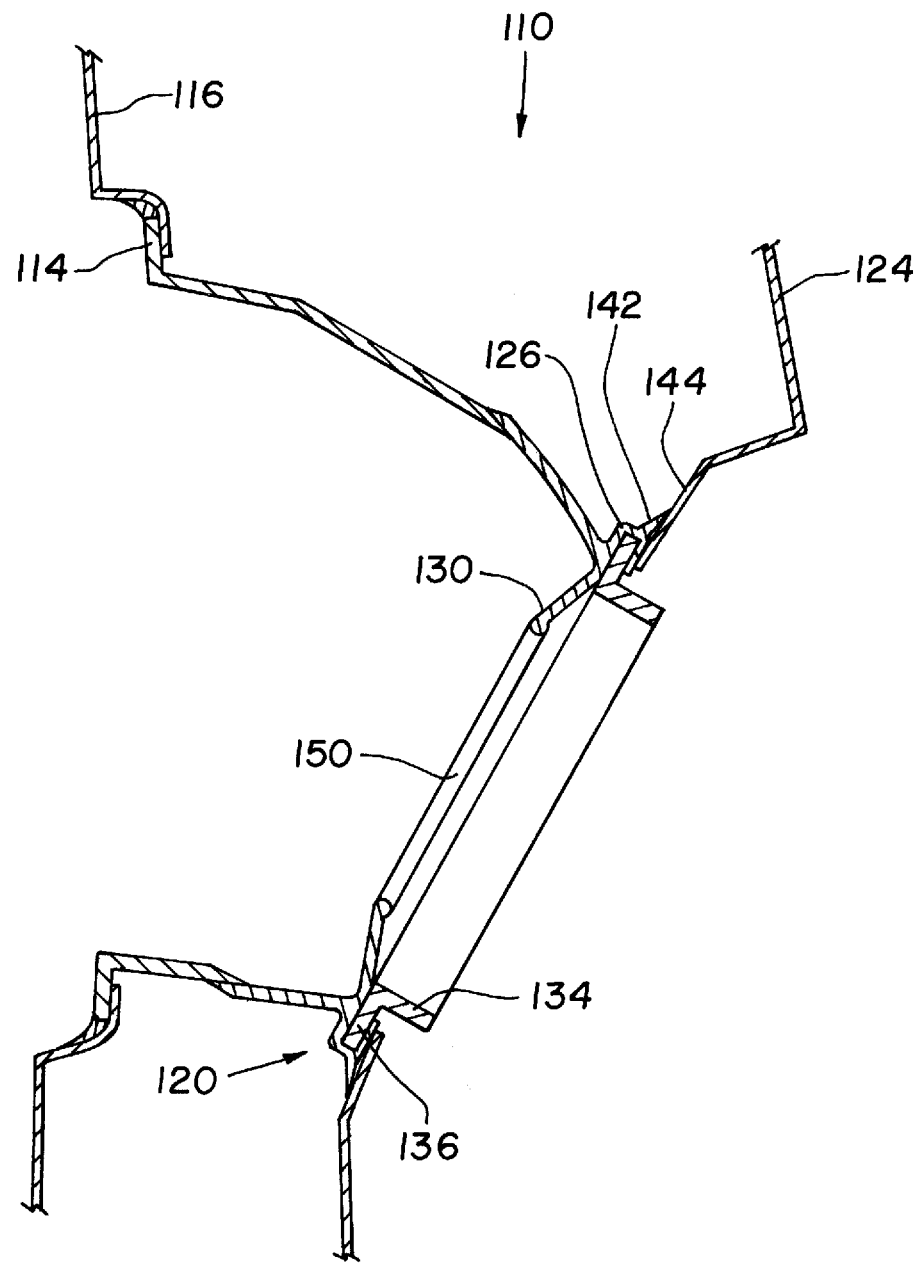
FIG. 3 is a cross-sectional view of a fuel housing assembly with an overmolded snap-ring inner seal as disclosed herein.

As disclosed herein for an exemplary embodiment, an integrated, floating, snap-ring and seal for a plastic fuel housing assembly 110 is shown in greater detail in FIGS. 2 and 3. Exemplary fuel housing assembly 110 includes a fuel housing 112 and an outer perimeter seal 114 sealed to an outer sheet-metal panel 116. Fuel housing 112 can include integrated snaps or other structures for physically connecting fuel housing 112 to outer sheet-metal panel 116 while creating a seal between outer perimeter seal 114 and outer sheet metal panel 116.

An inner seal assembly 120 provides a sealing structure to a fuel pipe similar to fuel pipe 22 shown for fuel housing assembly 10 and to an inner sheet-metal panel 124. Inner seal assembly 120 includes a fuel housing pocket grommet 126, an inner seal lock ring 128 and an inner pipe seal 130. Inner seal lock ring 128 is integrated with pocket grommet 126 in an overmolded relationship, with pocket grommet 126 also being integrated with fuel housing 112 in a similar overmolded relationship. Inner pipe seal 130 is integrated with inner seal lock ring 128 by a similar overmolded relationship.

Fuel housing 112 and inner seal lock ring 128 are so called "hard shot" injection molded structures of hard plastic, such as glass filled polypropylene. Fuel housing pocket grommet 126 and inner pipe seal 130 are so called "soft shot" injection molded structures of softer, yieldable compliant plastics such as a thermoplastic elastomer. The hard shot components are molded and positioned in an injection mold tool cavity so that the soft shot components are molded thereon and bonded thereto. Material selections can be made so that the hot molten soft shot material permanently bonds to the solidified hard shot components. Further, various undercuts, cavities, ports or apertures can be used to create mechanical connections of the subsequently formed soft shot components to the previously formed hard shot components. Such overmolding techniques and processes are well-known to those skilled in the art and will not be described further herein.

Inner seal lock ring 128 provides a rigid attachment structure for connecting fuel housing assembly 110 to inner sheet-metal panel 124. Inner seal lock ring 128 establishes a physical attachment to inner sheet-metal panel 124. Accordingly, inner seal lock ring 128 can include one or several latching feature 132, such as a snap feature 132 to engage inner sheet metal panel 124. In the exemplary embodiment show, inner seal lock ring 122 is generally "L"-shaped, having an annular hoop 134 and a flange 136 extending outwardly from annular hoop 134. Snap features 132 are provided on hoop 134 of the exemplary embodiment shown in the drawings.

Fuel housing 112 provides rigidity to fuel housing assembly 110 and can support a hinge arm which holds a fuel door, which may be similar to fuel door 40 shown in FIG. 1. The fuel door is supported in changing positions by the hinge arm as the fuel door is opened and closed during a refueling operation.

Fuel housing pocket grommet 126 encapsulates an outer perimeter edge of flange 136 of inner seal lock ring 122, and defines a seal skirt 142 projecting outwardly therefrom. Seal skirt 142 engages a surface 144 of inner sheet-metal panel 124 to create an effective seal. Accordingly, there is both a rigid attachment of inner seal lock ring 128 and a compliant seal of the soft shot material in fuel housing pocket grommet 126. Snap or latching features 132 hold the rigid ring to the sheet-metal panel and urge the softer material of the overmolded seal, and particularly seal skirt 142 thereof against the outer surface of the sheet-metal to effect a proper and adequate seal.

Inner pipe seal 130 is generally annularly shaped and defines an opening 150 therethrough for snuggly receiving a fuel pipe therein and creating a seal there against.

Inner seal lock ring 128 is said to float in that the flexibility of fuel housing pocket grommet 126 allows limited movement of inner seal lock ring 128 relative to fuel housing 112. Accordingly, installation during assembly of a vehicle is facilitated and easily completed by connecting snap features 132 to inner sheet-metal panel 124. Physical connection of snap features 132 to inner sheet-metal panel 124 ensures that the sealing portions of fuel housing pocket grommet 126 and inner pipe seal 130 are held in proper positions for sealing against surfaces of the panel and pipe. Seal skirt 142 thereby is held against surface 144.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An inner seal assembly for a fuel housing assembly, the fuel housing assembly having a rigid housing; said inner seal assembly comprising:
    a compliant body joined to the rigid housing;
    an inner seal lock ring joined to said compliant body and having a latching feature configured for attachment to a vehicle panel, said inner seal lock ring adapted to move with respect to the rigid housing during installation of the fuel housing assembly to the vehicle panel; and
    an inner pipe seal joined to said inner seal lock ring, said inner pipe seal defining an opening for receiving and engaging a fuel pipe.

2. The inner seal assembly for a fuel housing assembly of claim 1, said inner seal lock ring being made of glass filled polypropylene.

3. The inner seal assembly for a fuel housing assembly of claim 1, said latching feature being a snap feature.

4. The inner seal assembly for a fuel housing assembly of claim 1, said compliant body being overmolded on said rigid housing.

5. The inner seal assembly for a fuel housing assembly of claim 1, said compliant body being at least in part a pocket grommet encapsulating a portion of said inner seal lock ring and including an outwardly projecting seal skirt.

6. The inner seal assembly for a fuel housing assembly of claim 5, said inner pipe seal being overmolded on said inner seal lock ring.

7. The inner seal assembly of claim 1, said inner pipe seal being overmolded on said inner seal lock ring.

8. The inner seal assembly of claim 7, said latching feature being a snap feature.

9. The inner seal assembly of claim 1, said inner seal lock ring including a hoop and a flange; said compliant body being at least in part a pocket grommet encapsulating a portion of said flange; and said pocket grommet including an outwardly projecting seal skirt.

10. The inner seal assembly of claim 9, said compliant body being overmolded on the rigid housing.

11. A vehicle fuel housing assembly, comprising:
an outer panel;
an inner panel;
a fuel housing engaging said outer panel; and
an inner seal assembly establishing a sealing connection of said housing to said inner panel, said inner seal assembly including:
a compliant body joined to said fuel housing
an inner seal lock ring joined to said compliant body to enable movement of said inner seal lock ring with respect to said fuel housing, said inner seal lock ring including latching features; and
said compliant body defining both an inner pipe seal defining an opening for receiving and engaging a fuel pipe and an outwardly projecting seal skirt for engaging against said inner panel.

12. The vehicle fuel housing assembly of claim 11, said compliant body being overmolded on said fuel housing and defining a pocket grommet at least partly encapsulating said inner seal lock ring.

13. The vehicle fuel housing assembly of claim 12, said inner seal lock ring including a hoop and a flange, and said pocket grommet encapsulating a portion of said flange.

14. The vehicle fuel housing assembly of claim 13, said pocket grommet having an outwardly extending seal skirt.

15. A vehicle fuel housing assembly, comprising:
a rigid housing; and
an inner seal assembly connected to said rigid housing, said inner seal assembly including:
a compliant body joined to said rigid housing by overmolding;
a rigid inner seal lock ring joined to said compliant body by overmolding to allow said rigid inner seal lock ring to float with respect to said rigid housing, said inner seal lock ring having a vehicle body panel engaging latching feature; and
said compliant body defining both an inner pipe seal configured to receive a fuel pipe therein, and an outwardly projecting seal skirt for engaging a sheet-metal panel.

16. The vehicle fuel housing assembly of claim 15, said inner seal lock ring having a hoop and a flange; and said latching feature including a snap feature on said hoop.

17. The vehicle fuel housing assembly of claim 16, said compliant body encapsulating an outer edge of said flange.

18. The vehicle fuel housing assembly of claim 16, said compliant body defining a pocket grommet encapsulating an outer edge of said flange; and said seal skirt projecting from said pocket grommet.

19. The vehicle fuel housing assembly of claim 18, said rigid housing and said inner seal lock ring being made of hard shot injection molded plastics.

20. The vehicle fuel housing assembly of claim 19, said compliant body being a soft shot plastic overmolded on said housing and said inner seal lock ring.

* * * * *